ns, forming a part of this specification, in
UNITED STATES PATENT OFFICE.

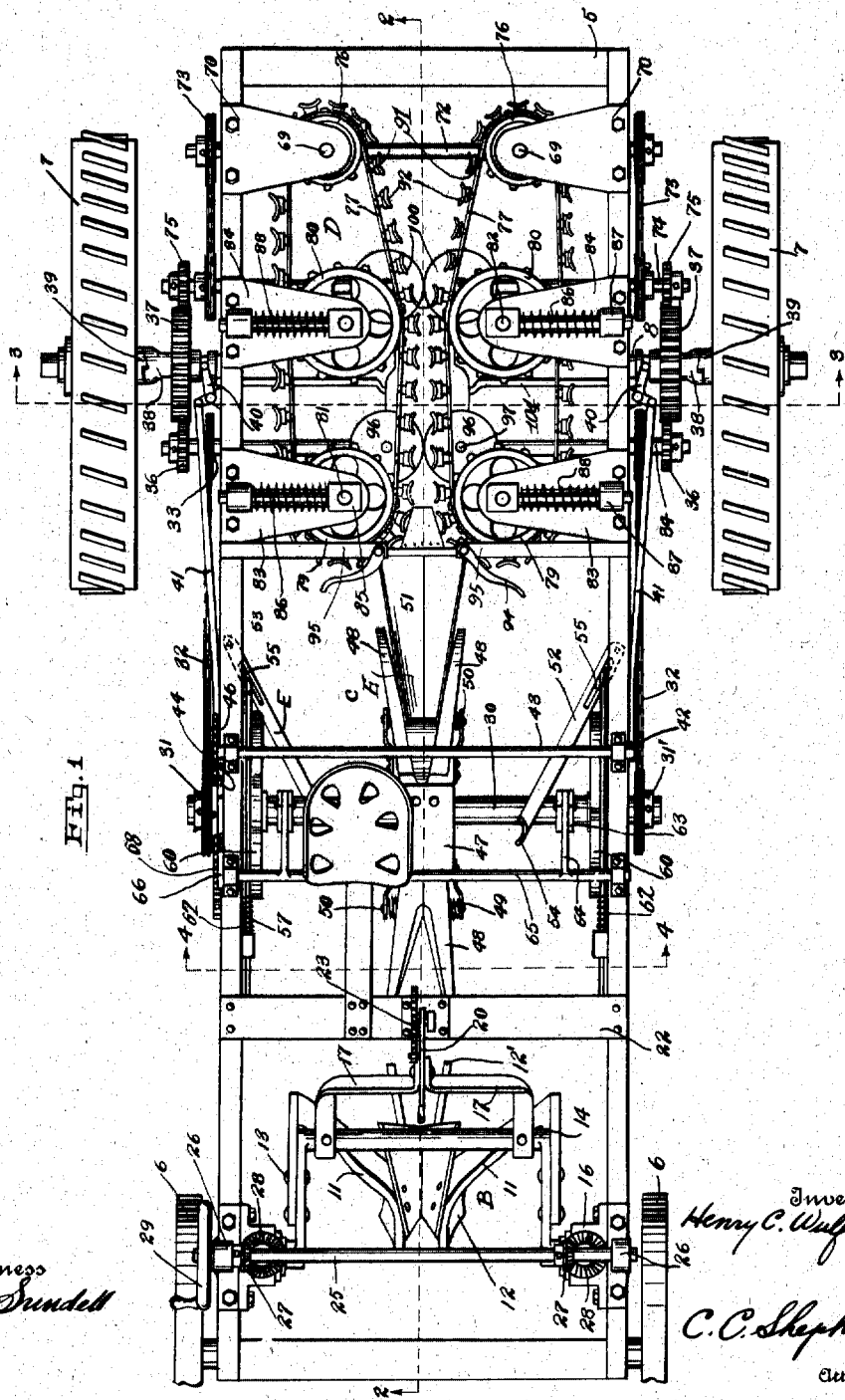

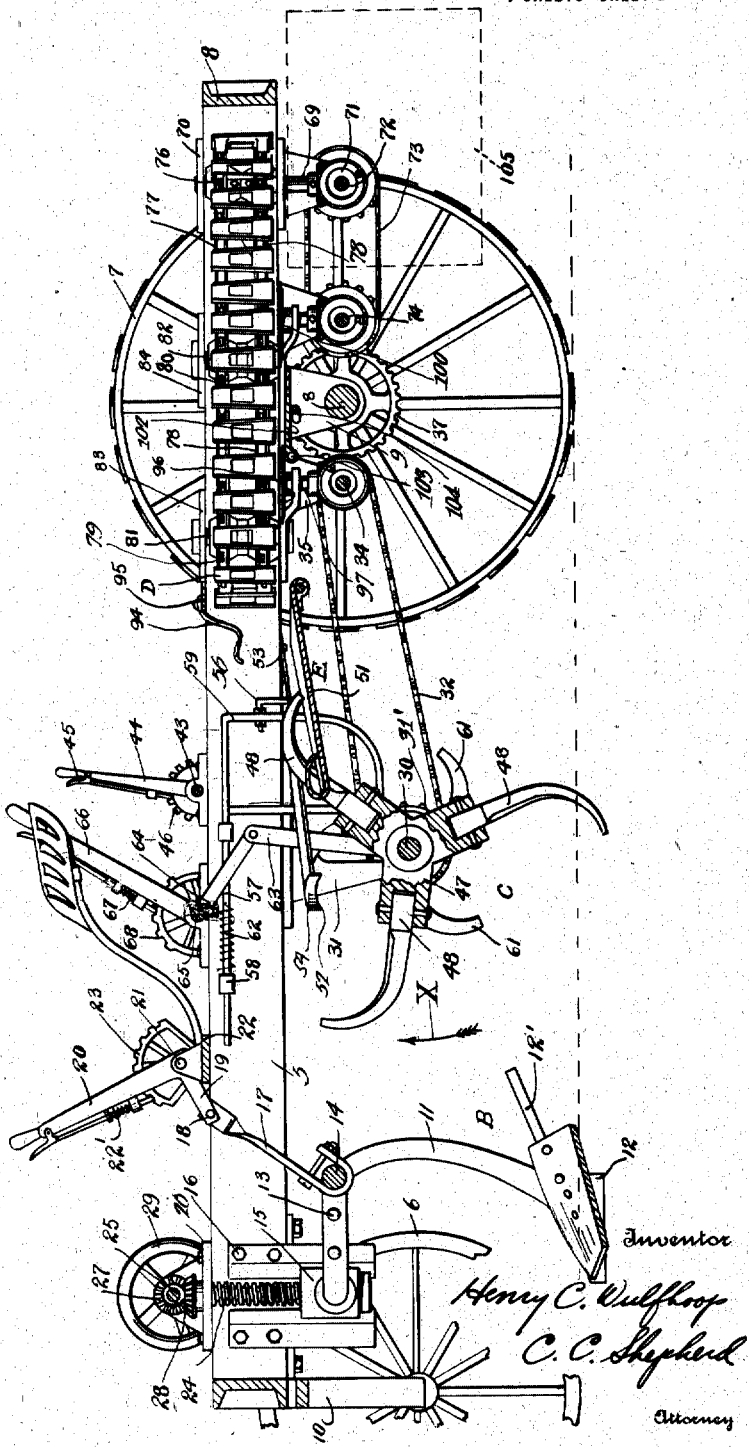

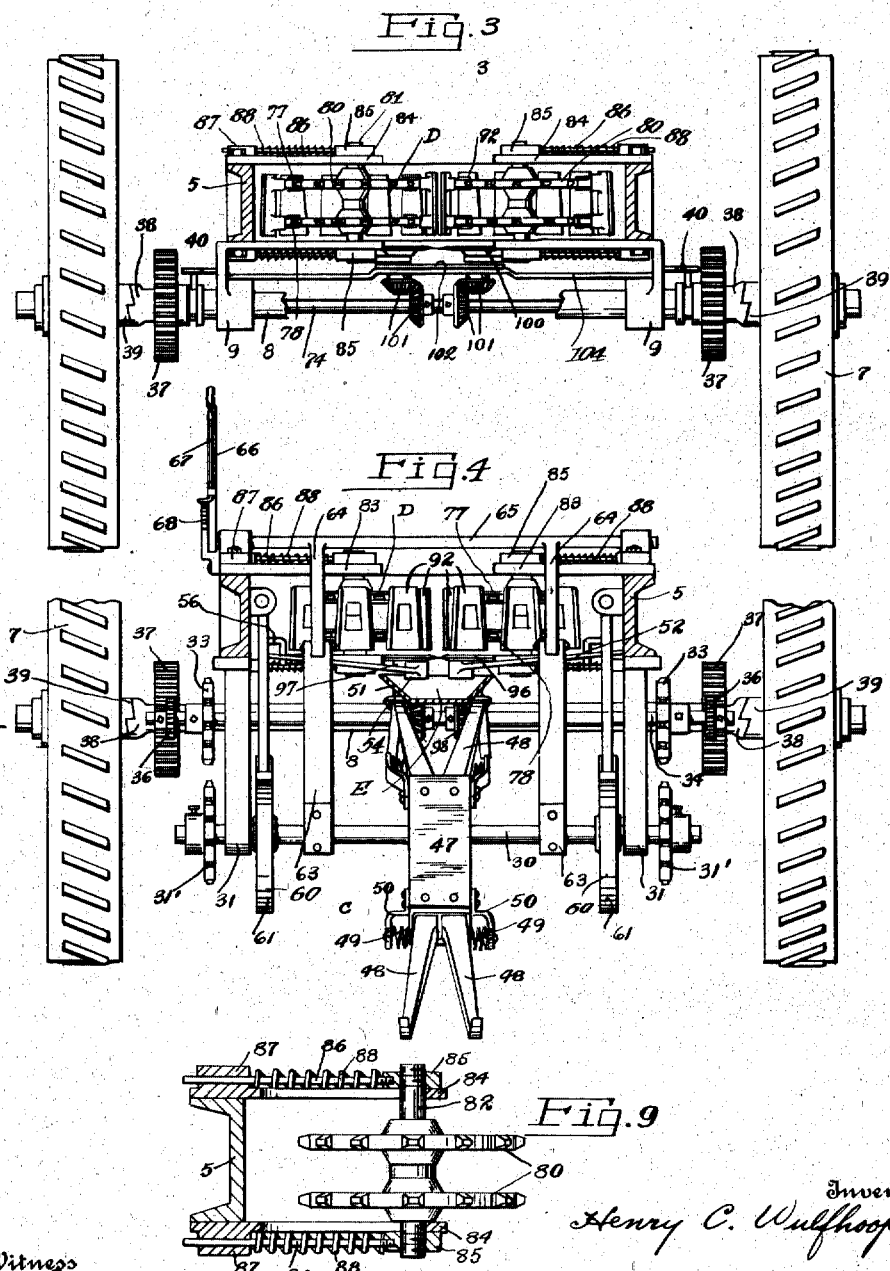

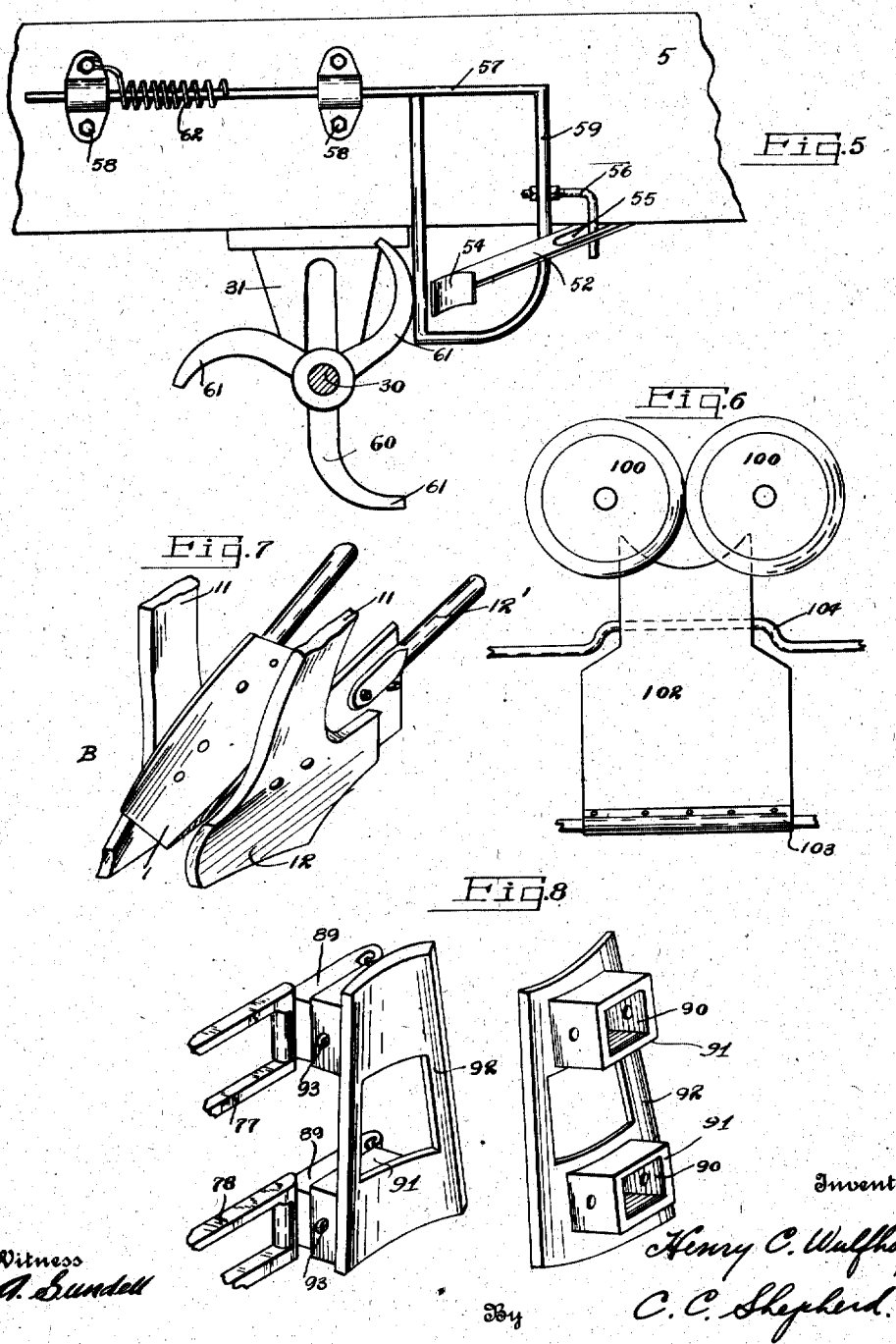

HENRY C. WULFHOOP, OF NEWARK, OHIO.

BEET-HARVESTER.

1,302,118. Specification of Letters Patent. Patented Apr. 29, 1919.

Application filed January 5, 1918. Serial No. 210,577.

*To all whom it may concern:*

Be it known that I, HENRY C. WULFHOOP, a citizen of the United States, residing at Newark, in the county of Licking, and State of Ohio, have invented certain new and useful Improvements in Beet-Harvesters, of which the following is a specification.

This invention relates to beet harvesters, and has for its object to provide an efficient, reliable and substantial machine for plowing, collecting and topping beets in an expeditious and labor saving manner.

Another object of the invention resides in a beet harvesting machine of novel and improved construction wherein are embodied means for topping the beets subsequent to the operation of loosening the same from the soil, and whereby the topping operation may be effected in such manner that each beet harvested by the machine will be cut to a uniform degree and all waste in this operation eliminated. Hitherto, many types of beet harvesting machines have been constructed so that the topping mechanism thereof is thrown into operation prior to the operation of extricating the beets from the soil. Practice has disclosed that this construction is not altogether efficient, due to the fact that the beets are embedded in the soil at different levels, thus the topping mechanism of the machines of the prior art, operating on a constant level sever the beet tops at different points, so that more or less waste is involved during the topping operation.

A further object of the invention is, therefore, to provide an improved beet topping mechanism wherein all beets traveling through the same will be cut to a similar degree, and along correct waste reducing lines, whereby uniform severing of the beet tops from the bodies thereof may be effected.

A still further object of the invention resides in a beet harvester wherein is embodied a forwardly disposed beet plowing means, behind which is located a rotary puller designed to extract beets from the soil, mechanism being provided in conjunction with the puller for delivering beets from the latter into a topping mechanism, which mechanism includes features of construction which enable beets to be topped along uniform lines.

For a further disclosure of the invention, reference is to be had to the following description and to the accompanying drawings, forming a part of this specification, in which similar characters of reference denote corresponding parts throughout the several views thereof, and:

Figure 1 is a top plan view of the beet harvester constructed in accordance with the principles of the invention.

Fig. 2 is a vertical, longitudinal, sectional view taken along the line 2—2 of Fig. 1.

Fig. 3 is a transverse, sectional view taken along the plane disclosed by the line 3—3 of Fig. 1.

Fig. 4 is a similar view taken along the line 4—4 of Fig. 1.

Fig. 5 is a detailed vertical sectional view of the cam operating mechanism for effecting the insertion of beets into the topping mechanism.

Fig. 6 is a detail top plan view of the pivoted plate for controlling the depth of cut of the topping mechanism.

Fig. 7 is a fragmentary perspective view of the plow element.

Fig. 8 is a detached perspective view of the beet gripping elements forming a part of the topping mechanism.

Fig. 9 is a detail view of the resilient sprocket wheels.

Referring more particularly to the drawing, the harvester in its preferred form consists of a rectangular frame 5, composed of joined channel iron sections. The frame is supported for traction by means of front or steering wheels 6 and rear, main or driving wheels 7, the latter in this instance, being rotatably mounted upon a relatively stationary axle 8, carried by rigid bearings 9 depending from the frame 5.

The front wheels 6 are rotatably supported upon a pivoted yoke 10, in a manner common to drawn agricultural vehicles. In contrast to beet harvesters of the prior art, the present invention has the plow element B thereof situated adjacent to the forward end of the frame 5, so that beets harvested by the machine will be first subjected to the process of excavation or dislodgment prior to having the leaf growth formed therewith topped or severed from the body of said beets. The element B usually embraces a plurality of plow beams 11, which terminate at their lower ends in shares 12, and connected with the shares is a substantially V-shaped moldboard of common utility, the latter being provided with rearwardly extending fixed rods 12', which guide and permit of the discharge of the excavated beets immediately to the rear of the plow element.

The upper ends of the beams 11 are rigidly secured as at 13 to a crank shaft 14, the latter having its extremities pivotally mounted within sliding blocks 15, carried by guide members 16, which latter are firmly secured to the frame sections 5.

In order to adjust the depth of cut of the plow element, the crank portion of the shaft 14 has suitably connected therewith a plurality of yoke shaped links 17, the upper extremities of the latter, in turn, being secured as at 18 to the crank extremity 19 of a hand lever 20. The lever is pivotally mounted as at 21 upon a cross piece 22, extending transversely of the frame 5, and carried by said lever is the usual hand latch 22' and its coöperating segment 23. Thus it will be seen that by oscillating the lever, the shaft 14 will be correspondingly rocked about its pivotal center, thereby effecting a vertical adjustment of the plow element B, and the latter is retained in such adjusted position through the coöperation of the members 20, 22' and 23.

In operation, it is desirable that the plow element be maintained in a normal or substantially horizontal position, and in order to assume such position irrespective of the positions the hand lever 20 may occupy, the block elements 15 are provided with vertically disposed threaded bores, which latter are situated to receive vertically journaled feed screws 24. Thus by rotating the latter, the blocks 15 may be raised or lowered and thereby cause the longitudinally extending portions of the crank shaft to assume the desired horizontal positions. It will, therefore, be apparent that mechanism has been provided for regulating the plow element so as to control the depth of a furrow made thereby, or to elevate the same to an inactive position when it is not in service.

The rotation of the feed screws 24, is effected through the provision of a horizontally extending transverse shaft 25, which is suitably mounted for rotation within fixed bearings 26 mounted upon the forward end of the frame 5. The shaft 25 in this instance carries a plurality of bevel gears 27, which are positioned so as to mesh with similar gears 28, the latter being fixed to the upper extremities of the screws 24. It will be seen that by rotating the shaft 25, through the medium of the hand wheel 29 provided for this purpose, the feed screws will be set into motion so as to effect the raising and lowering of the sliding blocks 15, whereby a desired horizontal adjustment of the plow element may be readily obtained.

Located immediately to the rear of the plow element is a rotary beet puller or excavator C, which is adapted to remove beets from the soil and to conduct the same toward a topping mechanism D. The puller includes a transverse shaft 30, which is journaled for rotary movement in slotted bearings 31, rigidly depending from the frame 5, said bearings permitting of limited vertical movement on the part of the shaft 30 in order that the depth of operation of the puller may be controlled. Secured to the outer extremities of the shaft 30 are a pair of sprocket wheels 31' over which pass coöperating chains 32, which latter are also trained over similar sprockets 33 rigidly carried by a counter shaft 34, the latter being rotatably journaled within bearings 35 carried by the side members of the frame 5. The outer ends of the shaft 34 are provided with pinions 36 which normally mesh with larger gears 37, formed upon slidable clutch sleeves 38, said sleeves being carried by the main axle 8 and provided with clutch faces which are capable of engaging with similar faces found upon the hubs 39 of the rear traction wheels 7. Thus it will be apparent that when the sleeves 38 are in contact with the hubs 39, the rotary movement of the wheels 7 will impart similar movement to the gears 36 and 37, and this movement will be in turn transmitted to the shaft 30 through the chain and sprocket construction set forth.

In order to disconnect the sleeves 38 from the hubs 39, so as to govern the rotation of the shaft 30 and other associated mechanism, said sleeves are provided with annular grooves into which protrude pins or rollers carried by the arms of pivoted bell crank levers 40, which latter are carried by the frame 5. Leading from the opposite arms of the levers 40 are links 41, which have their forward extremities secured to crank elements 42, carried by transverse rock shaft 43. The shaft 43 is actuated through the medium of a hand lever 44, carried by said shaft, which lever is provided with the ordinary hand operated locking latch 45, the latter engaging with the usual form of toothed sector 46. Thus by rocking the lever 44, the sleeves 38 may be reciprocated so as to govern their rotary relation with respect to the traction wheels 7, thereby controlling, at the operator's will, the rotation of the puller shaft 30.

Rotatable with the shaft 30 is the puller proper, which consists preferably of a tri-armed block 47, the arms of said block being socketed at their outer ends, in which sockets are pivotally mounted the inner extremities of jaw members 48. The latter are usually arranged in pairs, and the same are formed to diverge outwardly and terminate in hooked extremities. The members 48 are permitted to be resiliently spread from their normal positions by virtue of helical springs 49, which springs are confined between fixed brackets 50 carried by the block 47, and the sides of said members 48.

In operation the puller mechanism is rotated through the means above described, or any equivalent means, in the direction indicated by the arrow X. This rotary movement permits the resilient jaw members of the puller to engage with beets loosely located in the soil, so as to pull or lift the same from said soil; the beets being wedged, as it were, between the resilient jaw members, thus insuring firm association of the beets with the puller mechanism so as to prevent loss of the former by lack of ability of the machine to extricate the beets from the soil. As many sets of jaw members may be provided as deemed necessary, however, the three sets shown have been found to impart satisfactory service, as the same are constantly in position to engage and receive soil situated beets.

In order to release the beets from the puller construction described and to transfer the same to the topping mechanism D, use is made of an intermediate structure E, which structure in this instance consists of a fixed, substantially triangular shaped apron 51, suitably carried by the frame 5. This apron is so disposed that its tapering extremity is located in the path of movement of the jaw members 48, whereby when the latter are rotated, the members of each set will upon engaging with the apron be spread or separated, against the influence of the springs 49. This operation permits beets carried by the members to be deposited upon the apron in an inverted position, that is, with the tops of the beets extending downward, or in engagement with the apron 51. Thus it will be seen that as the block 47 revolves, the members 48 will be brought into registration with the apron, and owing to the substantially wedge shaped formation of the latter, said members will be spread apart, this being due to the engagement of said members with the sides of the apron, so as to release the beets carried thereby to deposit the same in the manner described.

After the beets have been placed in an inverted position upon the apron, the same are removed therefrom and into the topping mechanism by the action of a plurality of pivoted ejecting arms 52. These arms are pivotally connected as at 53 to the under surfaces of the side members comprising the frame 5, and inner extremities of said arms terminate in semi-circular beet gripping elements 54, which elements, when the arms are revolved, are movable over the upper surface of the apron 51, so as to engage the beets carried by the latter. In order to oscillate the arms 52, the latter are provided with elongated slots 55, into which are positioned angularly shaped rods 56 rigidly carried by sliding frame members 57. The members 57 are slidably mounted in bearings 58 carried by the frame 5, and are provided with substantially yoke shaped extremities 59, which yokes carry the rods 56.

Rotatable with the puller shaft 30 are a plurality of cam members 60, which include curved wiping arms 61. Said arms are so located as to engage with the yoke shaped extremities of the sliding members 57, whereby upon the continued rotation of the cam members said sliding frames will be reciprocated in their bearings. Springs 62 are associated with the members 57 so as to retract the same to forward positions whereby the same may be engaged by the arms 61. Thus it will be seen that means have been provided for effecting the oscillation of the arms 52, so that the latter may be drawn across the apron 51 in order to discharge the contents of said apron into the topping mechanism B. Preferably, the cam members are so arranged as to engage with the yokes 59, after beets have been deposited on the apron 51, so that said apron will constantly be maintained in such condition as to readily receive freshly deposited beets from the jaw members 48.

In order to regulate the depth of operation of the puller construction C, the shaft 30 is equipped with a pair of upwardly extending links 63, which links have their upper extremities pivotally connected with crank arms 64 projecting from a frame journaled rock shaft 65.

Carried by the shaft 65 is a hand lever 66, the latter being employed to rock the shaft 65 so as to raise or lower the arms 64, whereby the shaft 30 is caused to assume adjusted positions within its slotted bearings 31. Connected as usual with the lever 66 is the latch pawl 67, which is adapted to engage with a toothed sector 68, whereby the adjusted positions of the crank arm 64 may be maintained.

After beets have been discharged from the apron 51 the same are ejected into a topping mechanism, which mechanism is designed to remove the excess foliage of the beets so as to render the latter in a more commercial condition. This mechanism includes a plurality of vertically spaced shafts 69, journaled for rotation within bearings 70. The shafts 69 are rotated by having the lower extremities thereof provided with beveled gears, which gears mesh with similar gears 71 mounted upon a horizontally extending shaft 72. The outer extremities of the shaft 72 are provided with sprocket wheels, over which are trained coöperating chains 73. The latter also pass over sprockets carried upon a horizontally extending disk rotating shaft 74. Pinions 75 are mounted upon the outer ends of the shaft 74 which pinions are adapted to engage with the gears 37 carried by the clutch sleeves 38. Thus it will be evident that when the machine is in operation the shafts 69 are rotated by the rotary movement of the main traction wheels 7.

Rotatable with the shafts 69, and carried by each shaft are a plurality of vertically spaced sprocket wheels 76, over which are trained upper and lower sets of endless link chains 77 and 78. The chains are also trained over forward and centrally disposed sets of sprocket wheels 79 and 80 respectively, which wheels are carried by vertically disposed shafts 81 and 82, the latter being journaled in slotted bearings 83 and 84 carried by the frame 5. The upper and lower extremities of the shafts 81 and 82 are equipped with blocks 85, which blocks carry horizontally disposed rods 86, the outer extremities of said rods being slidably mounted within lugs 87 protruding from the bearings 83 and 84. Surrounding the rods 86 and interposed between the blocks 85 and the stationary lugs 87 are coil springs 88, which springs normally serve to retain the shafts 81 and 82 at the inner extremities of the slots formed in the bearings 83 and 84, yet permit the sets of sprockets 79 and 80 to be moved outwardly in a resilient manner.

The chains 77 and 78 have certain links thereof formed with outwardly extending lugs 89, which lugs are adapted to enter sockets 90 provided in enlarged rectangular bosses 91 integrally formed with beet gripping elements 92. The lugs 89 and the bosses 91 are provided with alining apertures for the reception of removable cotter pins or the like 93, whereby the elements 92 may be firmly but removably carried by the chains 77 and 78. The elements 92 are so arranged upon the spaced chains 77 and 78 that the same will register in the manner shown in Fig. 1, that is with the elements 92 of each set of chains in directly opposed relation, so that a beet discharged from the apron 51 will be caught between a set of these elements 92 and conveyed through the topping mechanism. Guide members 94 are carried by a cross piece 95, contiguous to the forward end of the topping mechanism and serve to guide the beets into engagement with the elements 92. It will be noted that the latter are substantially curved in cross section and taper upwardly, this design being given the elements so that the same will conform with the approximate curvature of a sugar beet. The shafts 81 and 82 are of a slidable nature in order that beets of varying proportions may be gripped in a securer manner by the elements 92 without unduly squeezing or damaging the beets, and to thereby permit beets of all natural sizes to be readily received and conveyed rearwardly of the harvester through the mechanism described.

In order to effect the topping of the beets, there is provided a forward set of cutting disks 96, the cutting edges of which meet substantially between and immediately beneath opposed chain carried elements 92, so that the cutting disks will be in position to engage with the tops of beets as the latter are carried by said elements 92. The disks are carried by vertically disposed shafts 97, which are suitably journaled for rotation. The lower ends of the shafts 97 carry gears which are adapted to mesh with similar gears 98 carried by the horizontally disposed shaft 34, which is rotated through the pinion and gear construction 36 and 37 above described. It will be manifest that the beets will be caught in the topping mechanism by the elements 92 and conveyed rearwardly of the machine so that the tops of said beets will be severed by the rotary cutting disks 96, the latter in turn being driven by the main wheels 7 and subject to rotation at the vehicle operator's will. The disks 96 cut the major portion of the beet foliage away, which foliage may if desired be discharged into a suitable receptacle (not shown) or may drop to the ground.

In order to remove the relatively hardened upper portion of the beet and to cut all beets passing through the topping mechanism to a uniform degree, there is provided a set of rear cutting disks 100, which are located preferably just to the rear of the centrally disposed sprockets 80. These latter disks are carried by vertical shafts, and are rotated by gears 101 carried by the shaft 74, said gears 101 meshing with similar gears carried by the shafts employed for mounting the disks 100. In order to bring all of the beets into engagement with the disks 100 at a pre-determined level, there is provided an adjustable platform 102, which is pivotally mounted as at 103. A crank shaft 104 engages with the under side of the platform, and it will be seen that by rotating said crank shaft said platform may be raised or lowered. It will be seen that beets passing through the topping mechanism and after leaving the cutting disks 96 will engage with said platform, thereby causing said beets to assume the level of the rear end of said platform before engaging with the rear cutting disks 100.

In view of the fact that considerably greater pressure is required to hold the beets in position when the same are being cut by the rear disks 100, the central sprockets 80 are located nearer the center of the machine than the coöperating sprockets 76 and 79. This has the effect of drawing the beets into firmer engagement with the elements 92, whereby said beets may be securely retained in position when being subjected to the strains incident to passing through the rear cutting disks 100. The sprockets 76 are considerably smaller in diameter than the sprockets 80; this is done in order to permit the elements 92 to release the beets subsequent to the passage of the same through the rear cutting disks 100. This permits the beets to drop into a receiving receptacle 105 suitably carried by the harvester, said receptacle being of the ordinary trip variety, which when filled may be actuated to release the beets so as to cause the same to drop upon the ground in piles, whence they may be conveniently collected. If desired the shafts supporting the cutting disks 96 and 100 may be adjustable laterally so that when the cutting edges become worn, the same may be moved closer together so as to maintain the standard of efficiency of said cutters.

From the foregoing it will be seen that there is provided mechanism whereby the objects of the present invention have been achieved and that all of the advantageous features of construction above mentioned are, among others, present. The machine provides means for digging the beets, dislodging the earth therefrom, and for effecting the topping of the plants. The conveyer employed by the topping mechanism readily accommodates itself to the inequalities in size of the beets harvested, coöperating means being employed to insure the cutting of said beets at desired points. The machine may be used for harvesting vegetation other than beets without any change over the construction shown, and changes therein may be made, within the scope of the following claims, to adapt the same to other uses than that described. The harvester is composed of relatively few parts and is not likely to get out of order so as to require repairs; it is simple in construction and in operation and is entirely under the control of one man, and in view of the results accomplished, the harvester is comparatively inexpensive to build.

Having described the invention, what is claimed is:

1. In a beet harvester, beet pulling mechanism comprising a rotatable traction driven hub element, pivoted resilient jaw members carried by said element and arranged to extend radially therefrom, whereby during the rotation of said element said jaw members will be capable of gripping and removing beets from the soil, a table situated to extend between said jaw members when the latter reach predetermined positions in their cycle of movement in order to separate said members and to effect the deposit of beets upon said table, and a plurality of oscillatory arms situated to advance over said table to discharge beets from the latter.

2. In a beet harvester, beet pulling mechanism comprising a rotatable traction driven hub element, pivoted resilient jaw members carried by said element and arranged to extend radially therefrom, whereby during the rotation of said element said jaw members will be capable of gripping and removing beets from the soil, a table situated to extend between said jaw members when the latter reach predetermined positions in their cycle of movement in order to separate said members and to effect the deposit of beets upon said table, a plurality of oscillatory arms situated to advance over said table to discharge beets from the latter, and means whereby said arms will be swung across said table when said jaw members are out of engagement with the latter.

3. In a beet harvester, beet pulling mechanism comprising a rotatable hub element, pivoted jaw members carried by said element and rotatable in unison therewith, said members being capable of receiving and removing beets from the soil, a table situated to extend between said jaw members when the latter reach predetermined positions in their cycle of movement, said table being arranged to effect the separation of said jaw members in order to deposit beets upon the table, a plurality of oscillatory arms situated to move over said table so as to discharge beets from the latter, means whereby said arms will be swung across said table when said jaw members are out of engagement with the latter, said means comprising a plurality of cam elements rotatable with said jaw members, and a plurality of spring pressed frames situated to engage with said cam elements to effect the oscillation of said arms.

4. In a beet harvester, beet pulling mechanism comprising a rotary hub, pairs of forked jaw members pivotally carried by said hub, resilient means tending to maintain said jaw members in coöperative relation, whereby the same will be capable of removing and receiving beets from the soil, a table relatively rigid with respect to said jaw members and situated to effect the lateral separation of the latter so as to deposit beets upon said table, and means actuating in unison with said jaw members to effect the advance of beets over and their removal from said table.

5. In a beet harvester, the combination with a rotary beet puller, comprising a traction driven shaft, a hub element rotatable in unison with said shaft, forked resilient jaws carried by said element and arranged to pick up and receive beets from the soil, of a table, means for releasing beets from engagement with said jaws and to permit of their deposit upon said table, pivoted arms movable across said table to advance beets thereover, and means coöperative with said shaft to effect the actuation of said arms.

6. In a beet harvester, the combination with means for effecting the removal of beets from the soil, said means comprising a rotary member, resiliently separable jaws carried by said element and arranged to pick up and receive beets from the soil, of a table situated in the path of movement of said jaws, said table being adapted to release beets from engagement with said jaws and to receive the discharged beets, and means operable in unison with said jaws to remove beets from said table.

7. In a beet harvester, a frame, a shaft rotatably carried by said frame, means for rotating said shaft, a bearing member rotatable in unison with said shaft, sets of pivotally mounted forked arms carried by said member, resilient means tending to maintain the arms of each set in coöperative relation, a table mounted to separate said arms at predetermined positions in their cycle of movement and to effect the removal of beets therefrom, and means actuated from said shaft to discharge beets from engagement with said table.

8. In a beet harvester, a frame, a shaft rotatably carried by said frame, means for rotating said shaft, a bearing member rotatable in unison with said shaft, sets of pivotally mounted forked arms carried by said member, resilient means tending to maintain the arms of each set in coöperative relation, a table mounted to separate said arms at predetermined positions in their cycle of movement and to effect the removal of beets therefrom, and means actuated from said shaft to discharge beets from engagement with said table, and means for adjusting the depth of operation of said arms.

In testimony whereof I affix my signature in presence of two witnesses.

HENRY C. WULFHOOP.

Witnesses:
F. W. MOSER,
W. S. MCDOWELL.

Copies of this patent may be obtained for five cents each, by addressing the "Commissioner of Patents, Washington, D. C."